United States Patent
Soucy (12) 
(10) Patent No.: US 6,476,510 B2
(45) Date of Patent: Nov. 5, 2002

(54) SYSTEM, METHOD, AND APPARATUS FOR POWER REGULATION

(75) Inventor: Richard Soucy, St. Bruno (CA)

(73) Assignee: Bombardier Inc., Montreal (CA)

( * ) Notice: Subject to any disclaimer, the term of this patent is extended or adjusted under 35 U.S.C. 154(b) by 0 days.

(21) Appl. No.: 10/086,443

(22) Filed: Mar. 4, 2002

(65) Prior Publication Data

US 2002/0093201 A1 Jul. 18, 2002

Related U.S. Application Data

(62) Division of application No. 09/645,567, filed on Aug. 25, 2000, now Pat. No. 6,380,639.
(60) Provisional application No. 60/203,588, filed on May 11, 2000.

(51) Int. Cl.[7] ............................................... H02P 9/04
(52) U.S. Cl. ..................................................... 290/40 C
(58) Field of Search ............................. 90/40 C, 40 B; 60/39.281

(56) References Cited

U.S. PATENT DOCUMENTS

| | | | | |
|---|---|---|---|---|
| 3,701,556 A | * | 10/1972 | Richmond | 290/40 B |
| 4,341,071 A | * | 7/1982 | Abo et al. | 60/39.281 |
| 5,028,804 A | * | 7/1991 | Lauw | 290/40 C |
| 5,276,353 A | * | 1/1994 | Kobayashi et al. | 290/40 B |
| 5,539,258 A | * | 7/1996 | Sutton et al. | 290/40 B |
| 5,552,640 A | * | 9/1996 | Sutton et al. | 290/40 B |
| 5,629,568 A | | 5/1997 | Mertens | 290/40 R |
| 5,646,510 A | * | 7/1997 | Kumar | 290/40 B |
| 5,751,069 A | * | 5/1998 | Rajashekara et al. | 290/40 B |
| 5,949,146 A | * | 9/1999 | VandenBerghe | 123/339.19 |
| 6,405,522 B1 | * | 6/2002 | Pont et al. | 60/39.27 |

FOREIGN PATENT DOCUMENTS

| | | |
|---|---|---|
| EP | 0 643 474 A1 | 3/1995 |
| EP | 0 644 647 A1 | 3/1995 |
| EP | 0 903 469 A1 | 3/1999 |
| WO | WO 99/07996 | 2/1999 |

OTHER PUBLICATIONS

International Search Report dated Dec. 12, 2001 for PCT Application No. PCT/CA01/00670, filed Nov. 5, 2001.
Ice 3 on Right Tracks for High–Speed Rail Harmonisation—Passenger Rail Management, vol. 4, Issue 4, Nov. 1996, by Jurgen Prem., p. 19.
All Aboard for High–Speed Rail—Mechanical Engineering, Sep. 1996, by David Herman, pp. 94–97.
American Flyer—Popular Mechanics, Nov. 1996, by Jim Wilson, pp. 56–59.
Le Difficule Avenement Du <<Cisalpino>>—Rail Passion, N Jul. 10, 1996, by Philippe Herisse, pp. 46–48.
Quatre Pistes Pour L'Apres Grande Vitesse, La vie du Rail & des transports, N 2541, Apr. 10, 1996, by Dumont, Francois et al., pp. 14–18.
A Bord Du Nouveau Train Pendulaire Italien, La vie du Rail & des transports, N 2539, Mar. 27, 1996, p. 11.
Refined Gas Turbines Offer Lower Costs—Railway Gazette International, Jun. 1994, p. 401.
Le Pendulaire Dans la Course A L'ecosse—La vie du Rail & des transports, N. 2610, Sep. 3, 1997, by Jean–Paul Masse, p. 10.

* cited by examiner

Primary Examiner—Joseph Waks
(74) Attorney, Agent, or Firm—Pillsbury & Winthrop LLP (57) ABSTRACT

By controlling a power source in response to a load power demand, more efficient operation is obtained. Faster response is also realized by incorporating a compensation for inertia in the path between the power source and the load. In one exemplary embodiment, a further-driven system for electric power generation is controlled according to increased values of a load power demand and a turbine output shaft speed.

17 Claims, 12 Drawing Sheets

SYSTEM, METHOD, AND APPARATUS FOR POWER REGULATION

RELATED APPLICATIONS

This application is a divisional of application Ser. No. 09/645,567, filed Aug. 25, 2000, now U.S. Pat. No. 6,380,639 B1 on Jun. 12, 2002 the entirety of which is incorporated herein by reference.

This application claims the benefit of U.S. Provisional Application No. 60/203,588, filed May 11, 2000, and entitled "SYSTEM, METHOD AND APPARATUS FOR POWER REGULATION".

BACKGROUND OF THE INVENTION

1. Field of the Invention

This invention relates to power regulation. More specifically, this invention relates to control of a power source based at least in part on a power demand by a load.

2. Description of Related Art

Figure 1:
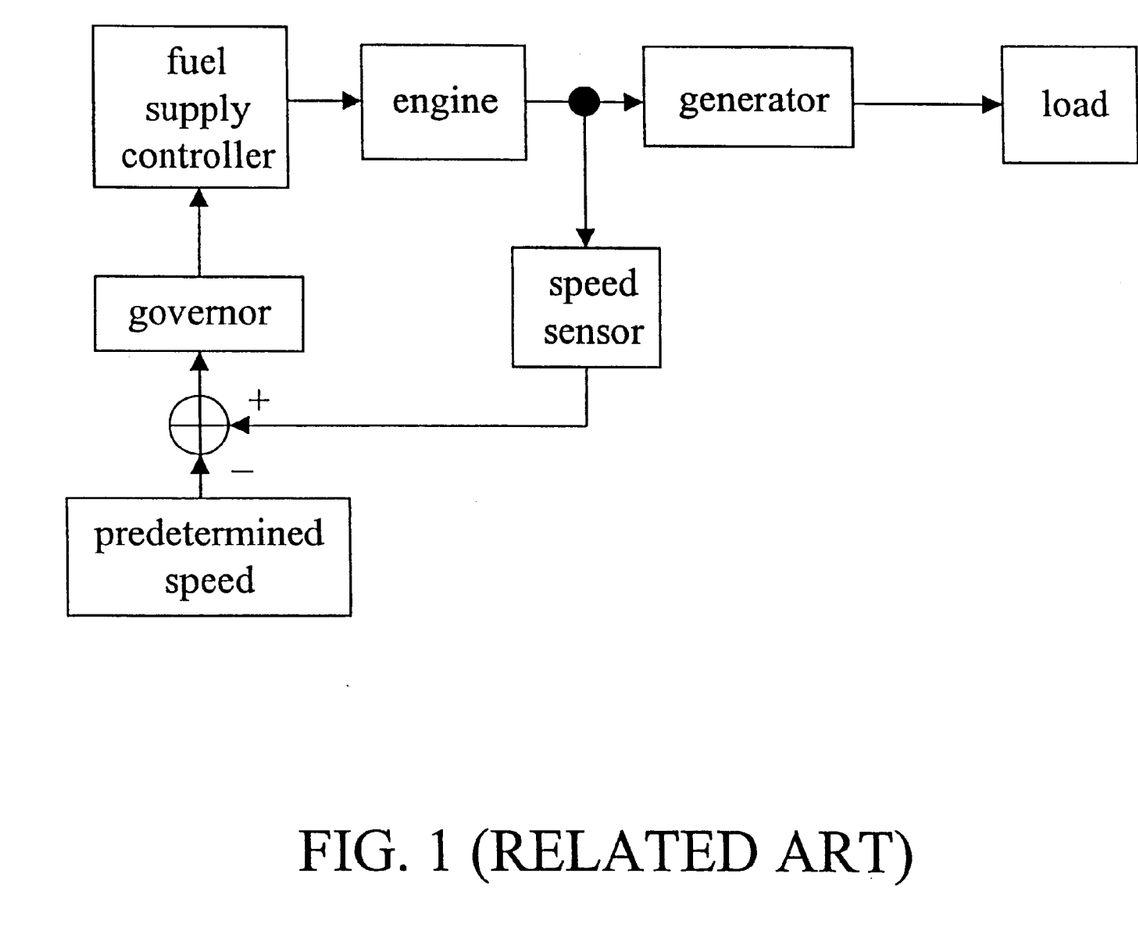
FIG. 1 shows a speed reactive system.
Figure 2:
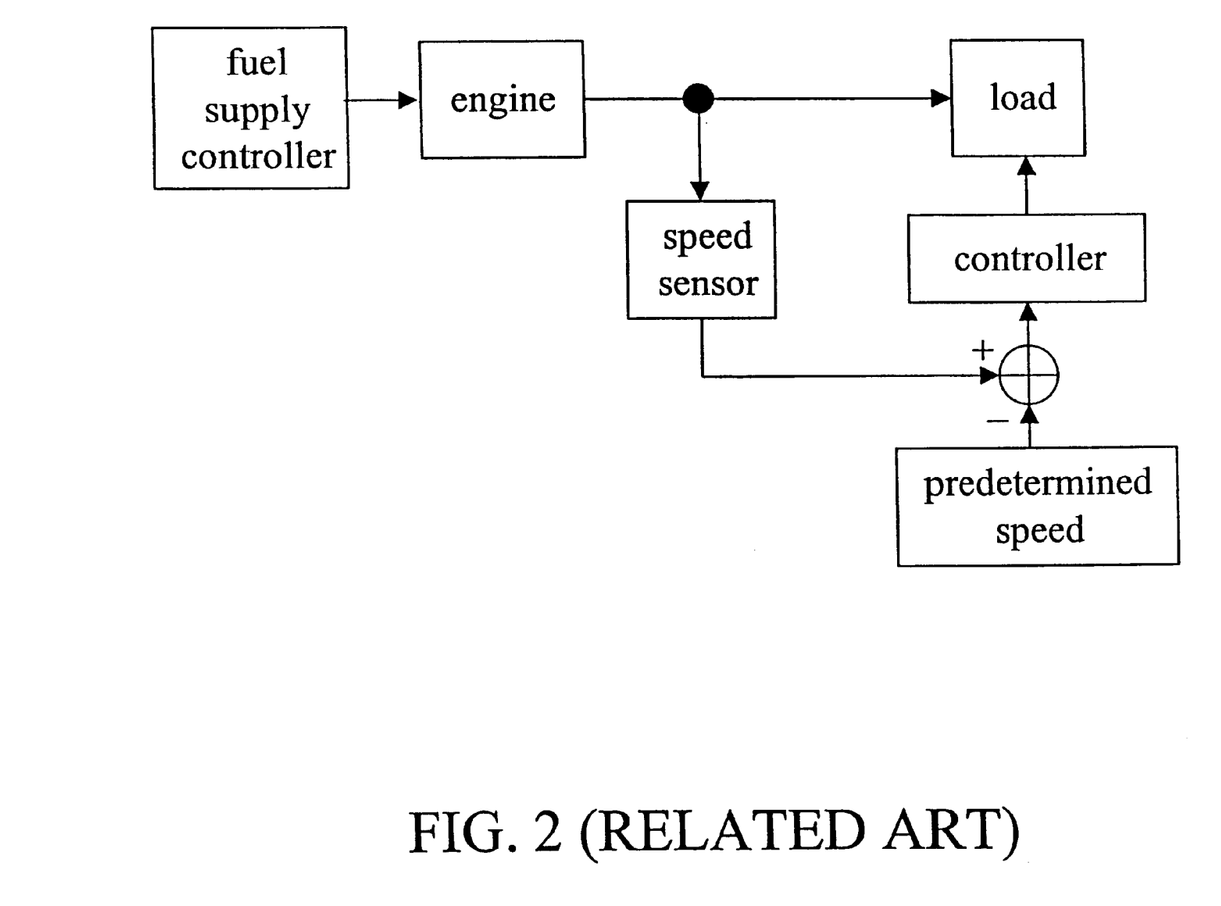
FIG. 2 shows a conventional power generation system.

FIGS. 1 and 2 show two conventional systems for power generation. In FIG. 1, an engine produces mechanical power that is inputted to a generator. For example, the engine may rotate a shaft that is coupled to the generator (possibly through a gearbox or transmission). The generator converts the mechanical power to electrical power that supplies a load. In response to an error between a predetermined engine speed output, and an actual engine output speed as measured by a speed sensor, a governor provides a command to a fuel supply controller, which controls the supply of fuel to the engine. Because the control of the engine is based upon the engine output speed, this type of control system may be called a speed reactive system.

A generator as shown in the system of FIG. 1 may produce electricity in either an alternating current (a.c.) or direct current (d.c.) form, depending on the requirements of the load. If a.c. is required, then the frequency of the current supplied by the generator must typically be regulated to within a small margin in order to avoid damage to the load. In the United States and Canada, e.g., a.c. current is typically maintained at 60 Hz. Because the rotational speed of the generator rotor determines the frequency of the electrical power produced, it is essential that the speed of the engine be regulated to a constant value.

Even if the load requires d.c. from the generator (possibly supplied via a rectifier or inverter), it may also be important to regulate the speed of the engine. In this case, the voltage of the d.c. output by the generator depends upon the speed of the engine. Although small variations in output voltage (i.e., ripples) maybe filtered out, avoiding damage to the load will typically require that an average voltage output of the generator (and hence an average speed of the engine) be kept constant. That is, even though the predetermined engine speed for a system according to FIG. 1 may yield good results over a broad range of conditions with respect to some criterion (e.g., minimal fuel consumption), one single value will typically be sub-optimal with respect to changes in such variables as pressure, temperature, and load power demand. Because fuel costs may account for 80% of the operating costs of such a system, increasing efficiency by even a few percent may result in a considerable cost savings.

Another shortcoming of speed reactive systems is that they operate without any knowledge of the power actually demanded by the load. Because the system reacts only to the engine output speed, its response is slowed by the inertia of the moving components in the power generation path, as no command with respect to speed may be met until the components are accumulated or decelerated as necessary.

FIG. 2 shows another system for engine speed regulation that is used, for example, in propeller-driven aircraft. In this system, it is also desirable to maintain engine output at a constant speed. An operator varies the power supplied by the engine to the load by commanding the final supply controller to adjust the supply of fuel to the engine. In order to maintain a constant engine output speed another controller varies the characteristics of the load. In response to a speed increase (possibly due to a command to increase power), for example, the controller may vary the pitch of the propeller, thereby increasing torque and maintaining a constant engine speed. For a given output speed, however, an engine will typically perform optimally (for example, with respect to fuel consumption) at only one particular power output value. Therefore, a control system as shown in FIG. 2 may also perform sub-optimally during much of its operation.

SUMMARY

In a system, method, and apparatus for power regulation as disclosed herein, a load power demand value determines a power supply behavior that is optimal with respect to some criterion (e.g., fuel consumption). Such a system, method and apparatus also complies with load demand requirements more quickly and efficiently than existing approaches.

DETAILED DESCRIPTION

Figure 3:
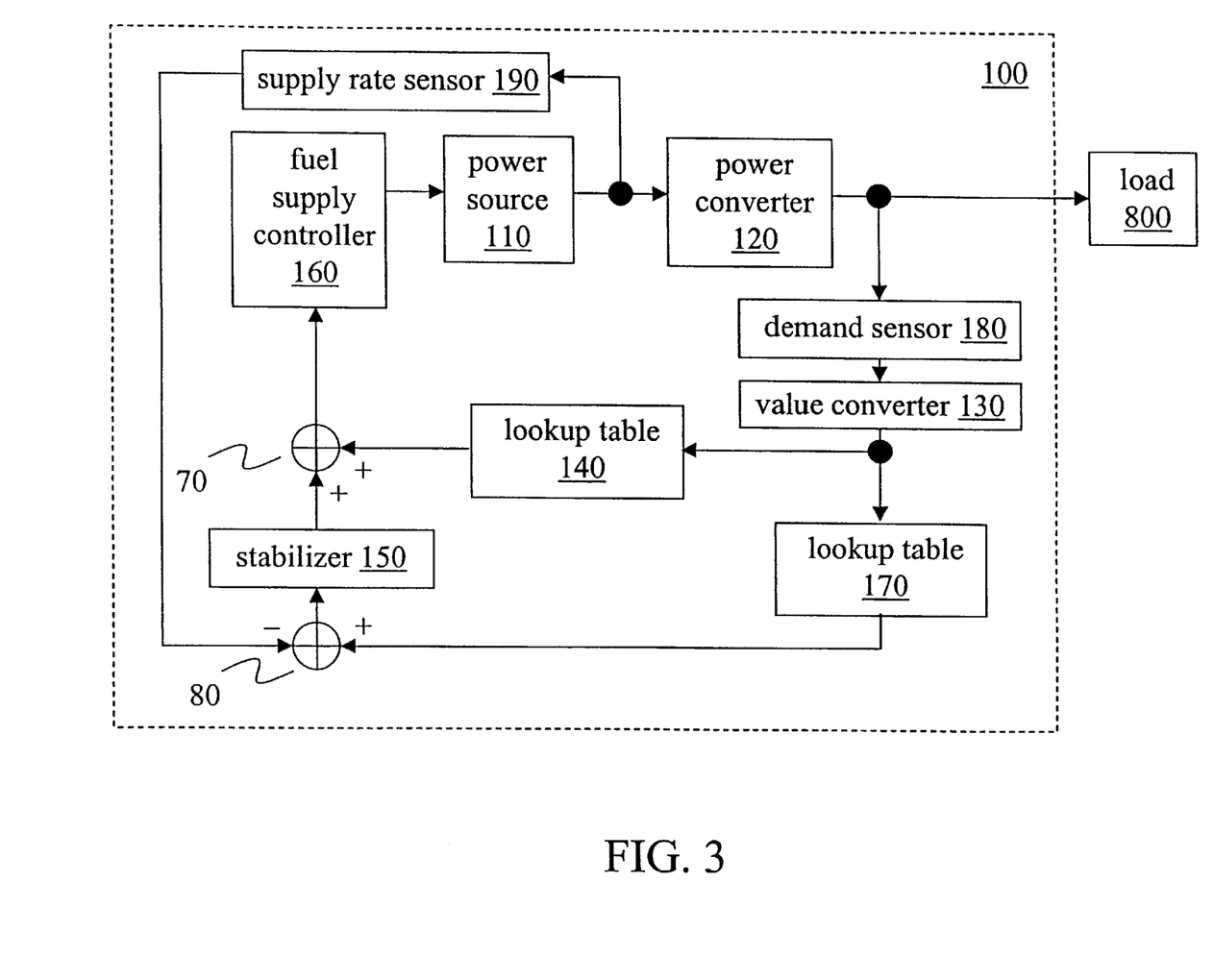
FIG. 3 shows a block diagram for a system according to an embodiment of the invention.

As shown in FIG. 3, system 100 according to an embodiment of the invention includes a power source 110 which supplies power through power converter 120 to drive a load 800. Demand sensor 180 senses the power consumed by the load. Value converter 130 receives the observed power consumption value and projects the power output that power source 110 must produce in order to meet the load demand. This power supply requirement value is outputted to lookup tables 140 and 170.

Lookup table 140 maps the power supply requirement value to a power demand value. A value based at least on part on this power demand value is inputted to fuel supply controller 160, which controls the supply of fuel to power source 110 accordingly. Lookup table 170 maps the power supply requirement value to a rate target value. After an observed rate value as indicated by supply rate sensor 190 is subtracted from the rate target value, the resulting rate error value is inputted to stabilizer 150, which produces an inertia compensation value. The power demand value is modified by this inertia compensation value, and the modified power demand value is inputted to fuel supply controller 160.

Figure 4:
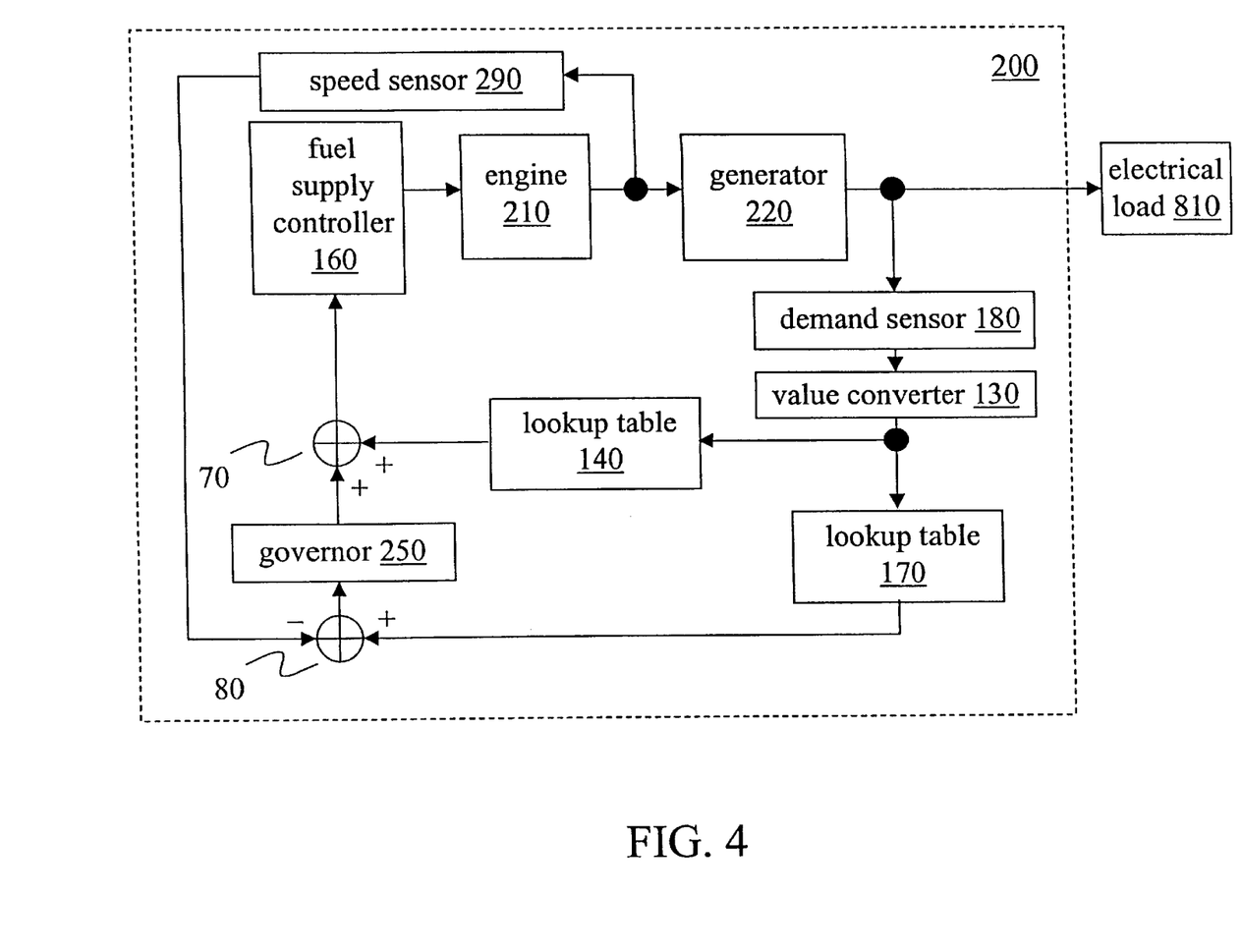
FIG. 4 shows a block diagram for a system according to an exemplary embodiment of the invention.
Figure 5:
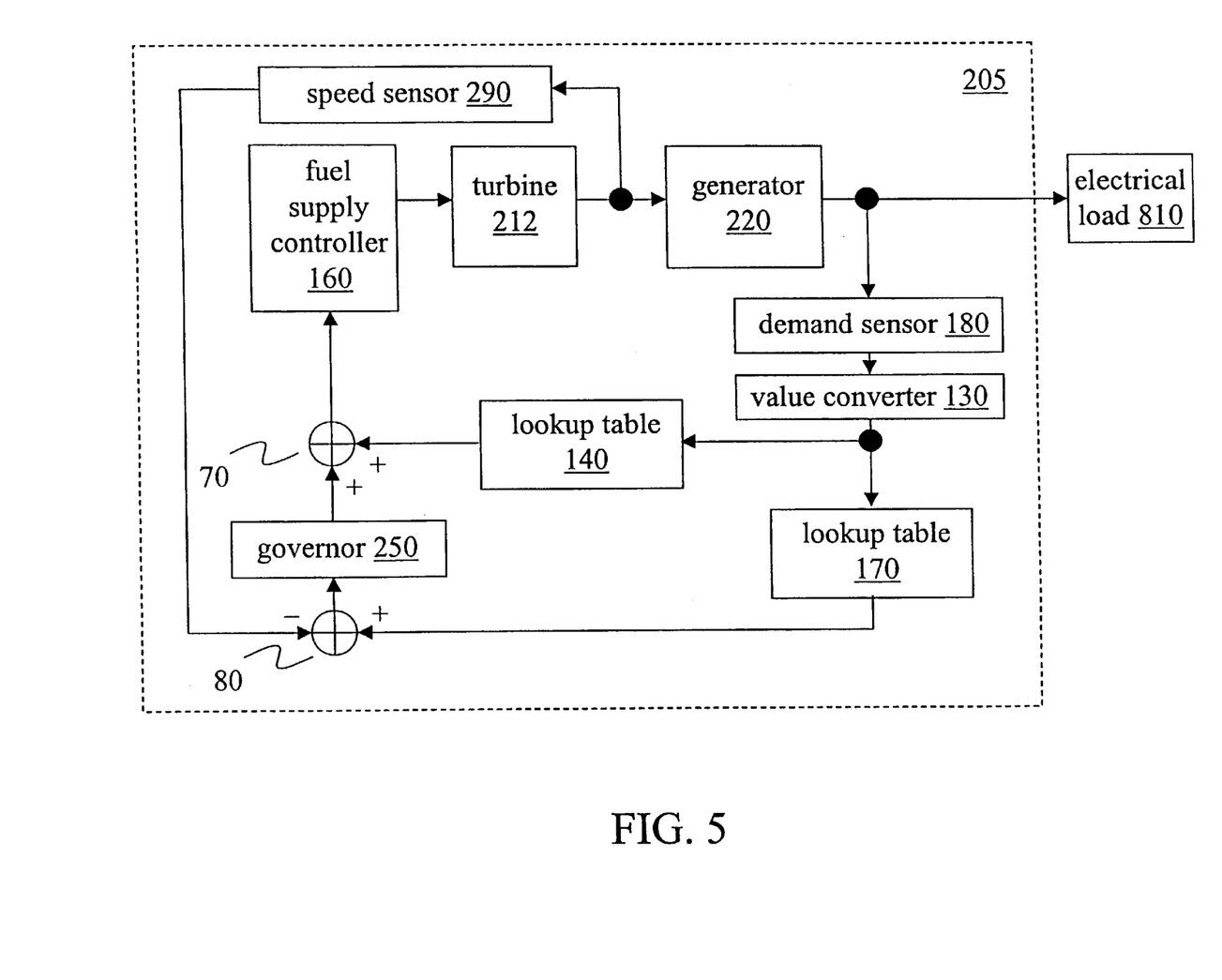
FIG. 5 shows a system according to an exemplary embodiment of the invention.

Power source 110 receives fuel via fuel supply controller 160 and produces power. This power, which is inputted to power converter 120, may be produced as mechanical energy, as thermal energy or as some other form of energy. Power source 110 may be an engine 210, as shown in FIG. 4, such as a diesel engine. In an exemplary implementation, as shown in FIG. 5, power source 110 is a gas turbine 212 which consumes a fossil fuel (e.g., diesel fuel) received via fuel supply controller 160 and which produces mechanical power by turning a drive shaft. In a particular implementation, the operation of gas turbine 212 is characterized by a speed of a compressor and a speed of a turbine output shaft, which need not be linked except by thermodynamic pressure. Turbine 212 may have several compressors and/or output shafts, and turbine 212 may also be of another type such as a vapor or steam turbine.

Power converter 120 converts the power received from power source 110 into a form as required by load 400. For example, this conversion may be from thermal to electrical power, or from electrical to mechanical power, or from thermal to mechanical power. In one implementation of the invention, power converter 120 comprises a generator that receives mechanical power outputted by power source 110 (e.g., by turning a drive shaft) and converts it into electrical power. In an exemplary implementation, power converter 120 comprises two or more generators and a gearbox that receives the mechanical power and distributes it among the generators in predetermined proportion. Power converter 120 may also include rectifiers, inverters, and/or filters to produce an output in the form required by load 800. In the exemplary implementations of FIGS. 4 and 5, electrical load 810 may comprise one or more motors which propel a fuel-powered locomotive that incorporates a system as described herein.

Demand sensor 180 outputs an observed power consumption value that relates to the power demand of load 800. This demand value may be expressed, for example, as watts or Joules. In the exemplary implementations of FIGS. 4 and 5, demand sensor 180 outputs a signal that relates to a level of electrical power demanded by electrical load 810. For example, demand sensor 180 may include one or more voltage sensors and one or more current sensors, wherein a power demand value corresponding to a particular component of electrical load 810 is obtained by multiplying together corresponding voltage and current values. Values may be sensed or outputted by demand sensor 180 according to a given digital sampling rate, for example, 50 Hz.

In a case where load 800 consumes thermal power (i.e., for heating and/or for cooling), demand sensor 180 may produce a value relating to a difference between a temperature of a component of load 800 and an ambient or a desired temperature. As above, the sensing and/or the output of values by the demand sensor 180 may be either analog or digital.

Value converter 130 receives the observed power consumption value from demand sensor 180 and produces a power supply requirement value in response. The power supply requirement value represents a projection of the power that power source 110 must supply in order to meet the load demand. In one implementation, value converter 130 produces the power supply requirement value by applying an efficiency reciprocal function to the observed power consumption value, wherein the efficiency reciprocal function represents the inverse of the efficiency of conversion of power converter 120. In this way, an estimate of the level of power output by power source 110 that will produce the load power demand at the output of energy converter 120 may be obtained. In a case where the efficiency reciprocal function may be expressed as a constant factor (i.e., the relationship between power inputted to and power outputted by power converter 120 is linear), value converter 130 may be constructed as a constant multiplier. In another case (e.g., for a more complex relationship), value converter 130 may comprise one or more lookup tables whereby a particular demand level may be interpolated to a corresponding power supply requirement. In the exemplary implementations of FIGS. 4 and 5, value converter 130 may compensate for the efficiency of one or more generators, gear boxes, rectifiers, inverters, and/or other components that may appear in the power path between the output of power source 110 and the input of electrical load 810.

Lookup table 170 receives the power supply requirement value produced by value converter 130 and outputs a corresponding rate target value. The map between the input power value and the output rate value that characterizes lookup table 170 may be optimized according to a particular criterion such as fuel consumption, emissions production, operating temperature, etc. In an exemplary implementation, for example, lookup table 170 applies a map that is optimized for minimum fuel consumption.

The relationship mapped by lookup table 170 may be a function of one or more other values as well. For example, a performance of a turbine 212 may also depend on a temperature of the air at the compressor intake, as the density of air may change dramatically with large changes in temperature. Similarly, large changes in altitude may also result in air changes in the ambient air pressure that will affect air density as well. Therefore, lookup table 170 may be implemented as a matrix of tables. Each such table may indicate a different mapping of power to rate, and the choice between the tables may be determined by sensed operating parameters such as air pressure and temperature, fuel characteristics, etc.

Supply rate sensor 190 outputs an observed rate value that relates to the rate of energy supply by power source 110. In the exemplary implementations of FIGS. 4 and 5, supply rate sensor 190 is implemented as a speed sensor 290 and outputs a value obtained by sampling (at a rate of 50 Hz) the rotational position or speed of a drive shaft driven by power source 110. In this case, the value outputted by speed sensor 290 relates to a speed of the drive shaft in revolutions per minute (rpm).

In adder 80, the observed rate value produced by supply rate sensor 190 is subtracted from the rate target value outputted by lookup table 170 to obtain a rate error value. Stabilizer 150 receives the rate error value and outputs an inertia compensation value according to one or more predetermined stabilization profiles. In an exemplary implementation, stabilizer 150 is a governor 250 that is implemented as a proportional-integral controller. The operation of such a controller is characterized by a proportional gain $K_p$ and an integral gain $K_i$. Proportional-integral controllers tend to decrease rise time and steady state error while increasing overshoot. Other forms of controllers (such as proportional, derivative, or proportional-integral derivative) may also be used for stabilizer 150 if different performance characteristics are desired. Although incorporating a derivative gain allows a system to reach the steady state sooner, such controllers also tend to add noise to the system. In exemplary implementations of FIGS. 4 and 5, the extra response provided by incorporating a derivative gain has not been necessary in practice.

Lookup table 140 receives the power supply requirement value produced by value converter 130 and produces the power demand value. In the exemplary implementation of FIGS. 4 and 5, the power demand value relates to a speed of a compressor of a turbine 212, which speed is strongly correlated with turbine output power.

As with lookup table 170, the relationship between power and speed, for example, that is mapped by lookup table 140 may depend on other operating parameters such as pressure and temperature as well. Therefore, lookup table 140 may be similarly implemented as a matrix of (e.g., 64) tables, wherein sensed values of such other operating parameters are used to select the desired mapping.

Fuel supply controller 160 receives the modified power demand value outputted by adder 70 and adjusts the supply of fuel to power source 110, accordingly. In the exemplary implementations of FIGS. 4 and 5, fuel supply controller 160 monitors the speed of a compressor of turbine 212, and adjusts the fuel supply such that the compressor speed complies with the modified power demand value. In another implementation, fuel supply controller 160 may control the fuel supply based upon other monitored values in order to maintain a desired correspondence between the modified power demand value and the operation of power source 110.

Because of the quick feedback path provided through lookup table 140, system 100 may adapt quickly to meet changes in the load demand level, thereby reducing both response time and fuel consumption. In the exemplary implementation of FIGS. 4 and 5, because the power demand value is modified by the inertia compensation value before it is inputted to fuel supply controller 160, the inertia encountered by the generated power in transfer from power source 110 to load 800 may be counteracted by increasing or decreasing the power demand value as appropriate. In these exemplary implementations, inertia is encountered in attempting to change the speed of the turbine output shaft, the components of the gear box, and the components of the generator, for example.

When adder 80 returns a positive value (i.e., the speed of the output shaft of turbine 212 is insufficient to support the power demand of electrical load 810), an augmented power demand value is inputted to fuel supply controller 160 in order to accelerate the inertial components more quickly to the desired speed. When the value outputted by adder 80 is negative (i.e., the turbine output speed is higher than the power demanded by electrical load 810 requires), then a reduced power demand value is inputted to fuel supply controller 160 such that the load may pull part of the required power out of the inertial components and thereby decelerate them to the appropriate speed more quickly.

Figure 6:
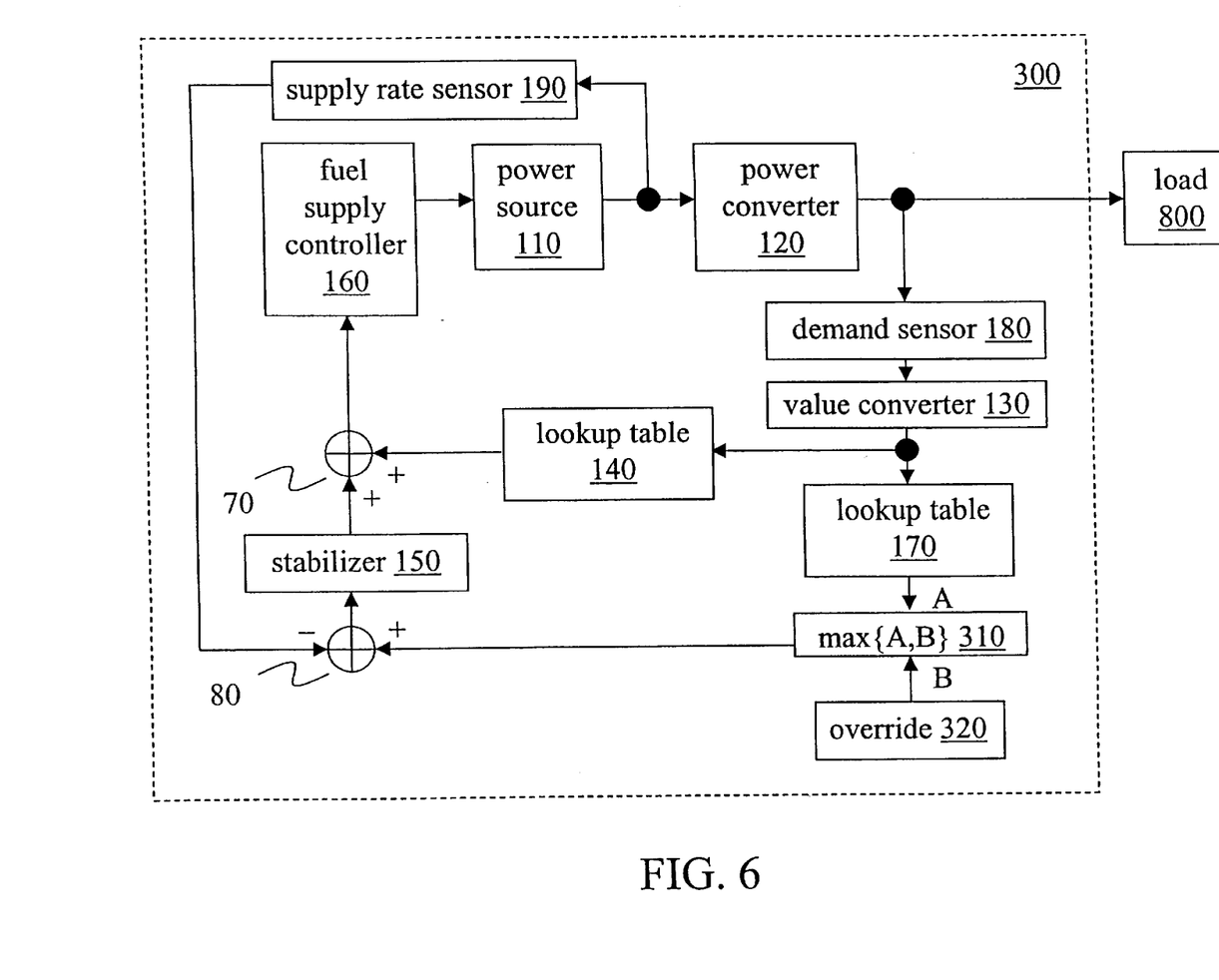
FIG. 6 shows a system according to an embodiment of the invention.

FIG. 6 is a block diagram of a system according to an alternative embodiment of the invention. In this embodiment, override 320 inputs a minimum rate requirement B to maximum function block 310. Maximum function block 310 outputs the maximum between the override rate B and the rate target value outputted by lookup table 170. Such an embodiment may be used in a case where a minimum rate is desired or required, regardless of the power demand of load 800. In the exemplary implementations of FIGS. 4 and 5, for example, it may be necessary to operate a generator at a minimum speed, regardless of the power drawn by electrical load 810. It is possible that the additional mode of operation described in FIG. 6 may only be initiated in the case of a malfunction of one or more components of load 800.

Because the relationship between power and rate which is mapped in lookup table 140 may be nonlinear, it may not be desirable to use fixed values for $K_p$ and $K_i$ in stabilizer 150. $K_p$ and $K_i$ values which are appropriate at low values of low power demand, for example, may not be appropriate at high levels of demand, due in part to this nonlinearity. In the alternative implementation shown in FIG. 7, such a difficulty may be avoided by moving the conversion from power to rate performed in lookup table 140 to a point subsequent to the summation in adder 70. In this case, stabilizer 450 converts the rate error value into an inertia compensation value that relates to power rather than rate. As a consequence, fixed values of $K_p$ and $K_i$ may be used in stabilizer 450. Lookup table 440 may be adjusted as necessary to perform the new mapping or mappings. Alternatively, as shown in the embodiment of FIG. 8, the rate values may be squared in squaring function blocks 460 and 470 before differentiation in adder 80. In this case, stabilizer 452 performs a similar conversion with possibly different fixed values of Kp and Ki. Because of the squaring of the rate values, the value outputted by stabilizer 452 bears. a closer resemblance to power; and, therefore, it is possible in the implementation to use the same mappings in lookup table 140.

Figure 7:
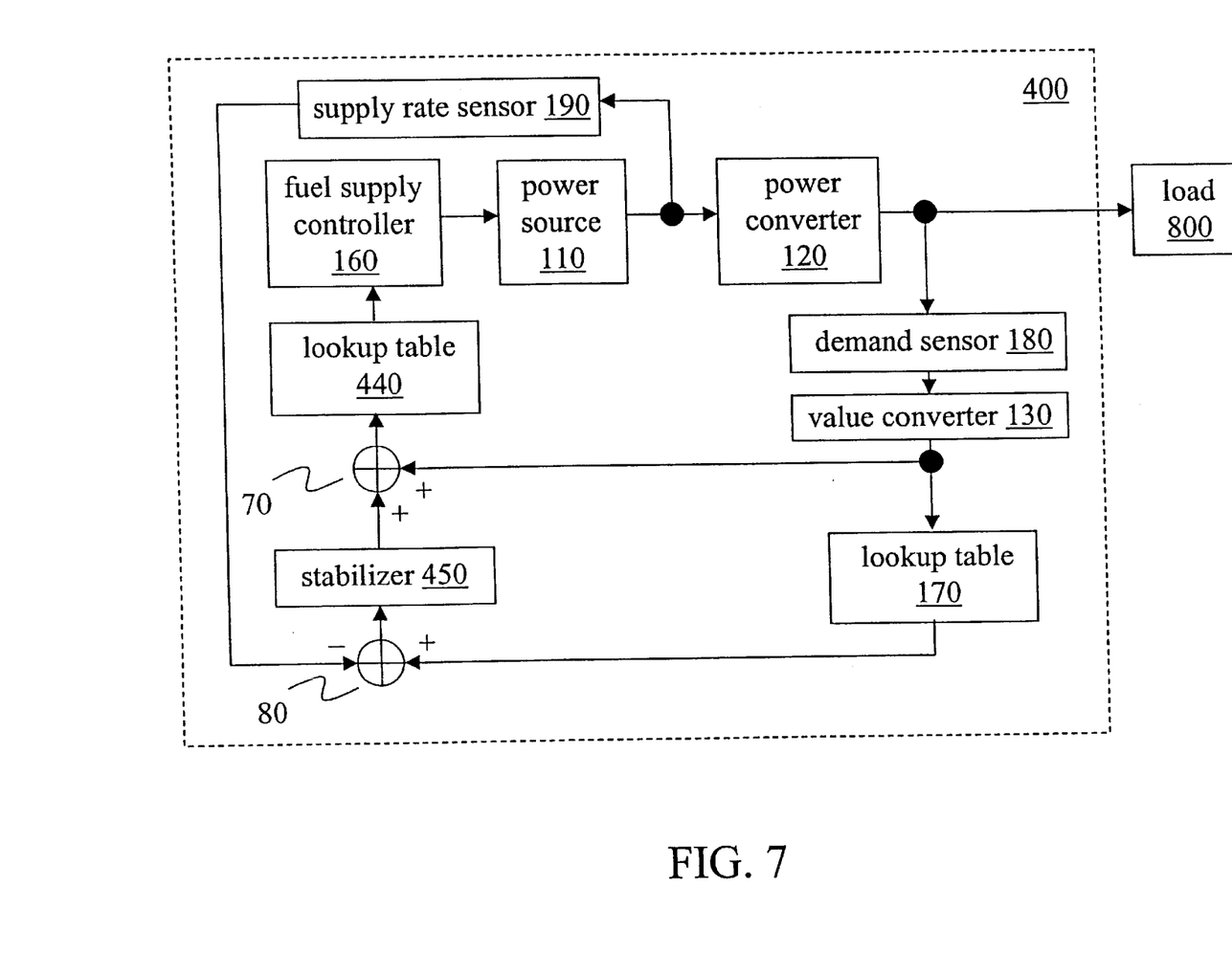
FIG. 7 shows a block diagram for a system according to an embodiment of the invention.
Figure 8:
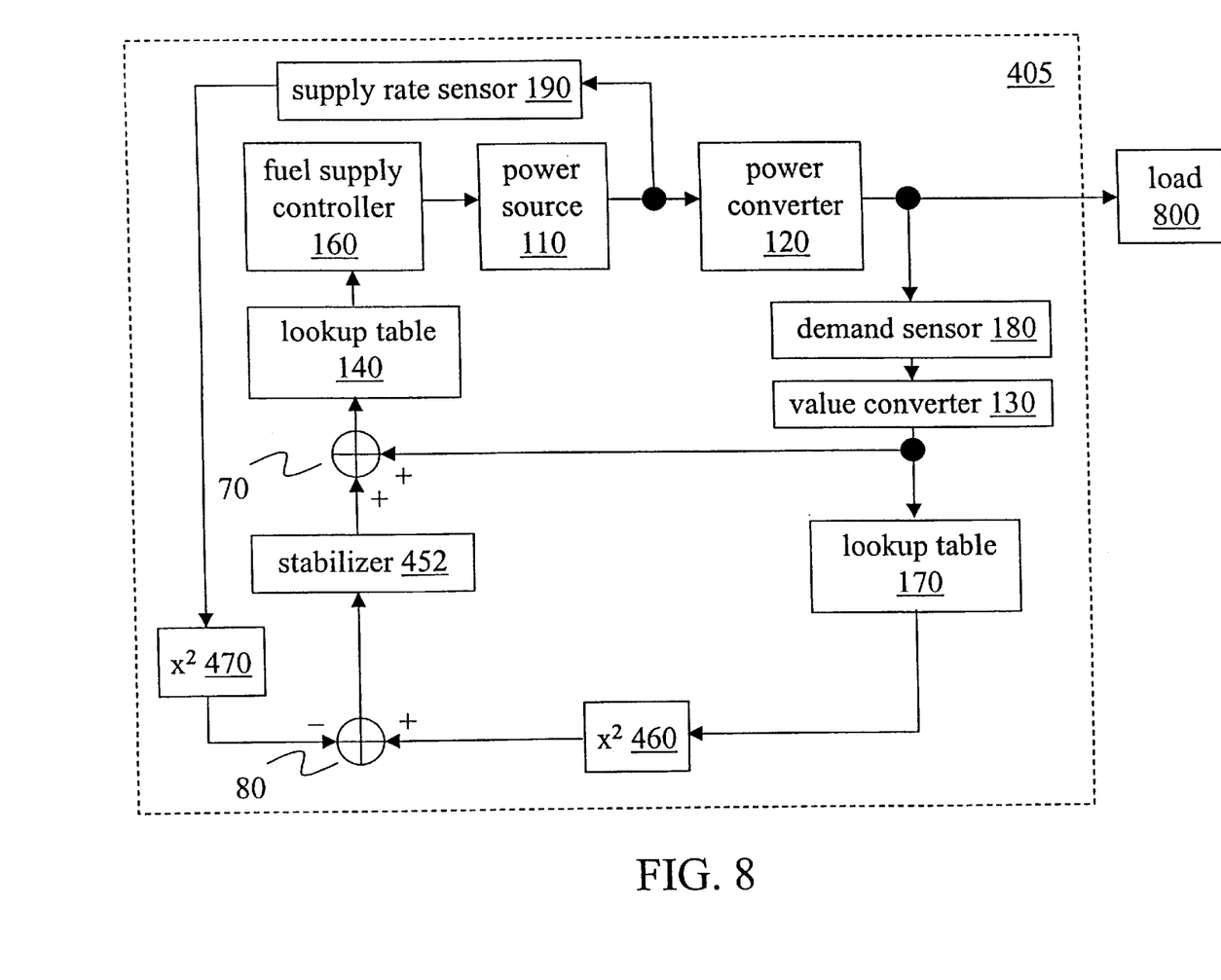
FIG. 8 shows a block diagram for a system according to an embodiment of the invention.
Figure 9:
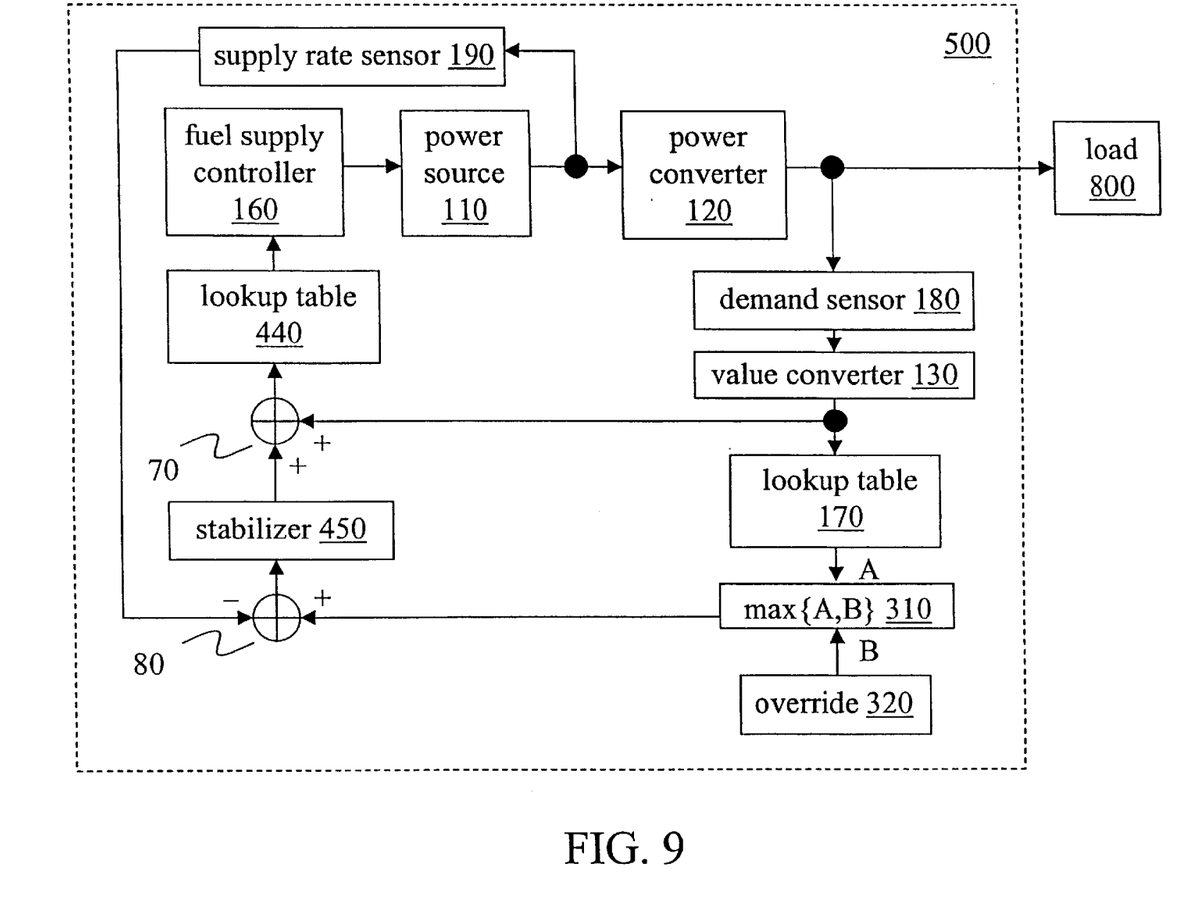
FIG. 9 shows a block diagram for a system according to an embodiment of the invention.
Figure 10:
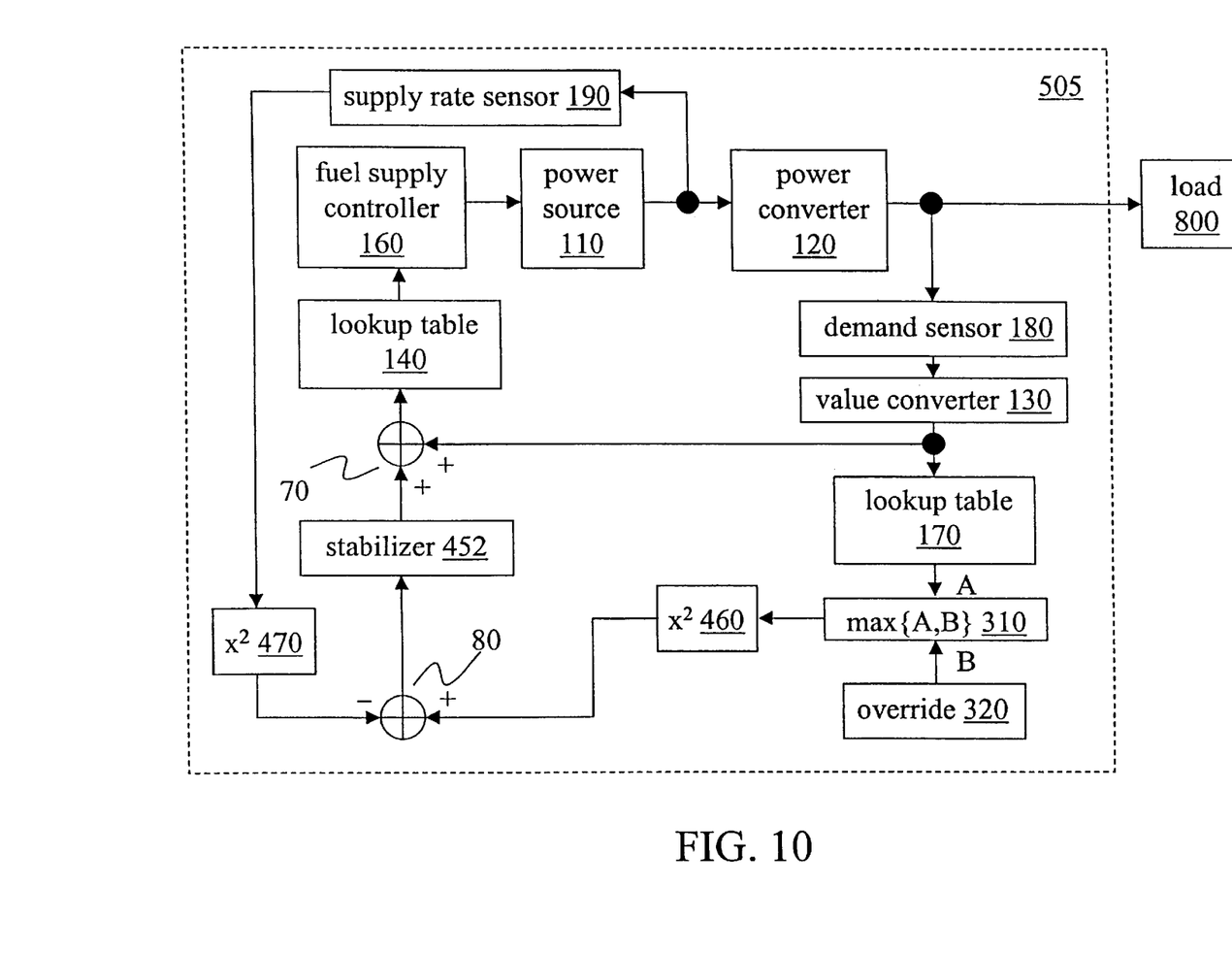
FIG. 10 shows a block diagram for a system according to an embodiment of the invention.

As shown in FIGS. 9 and 10, the modification described in FIG. 6 may be combined with the modifications shown in FIGS. 7 and 8.

Figure 11:
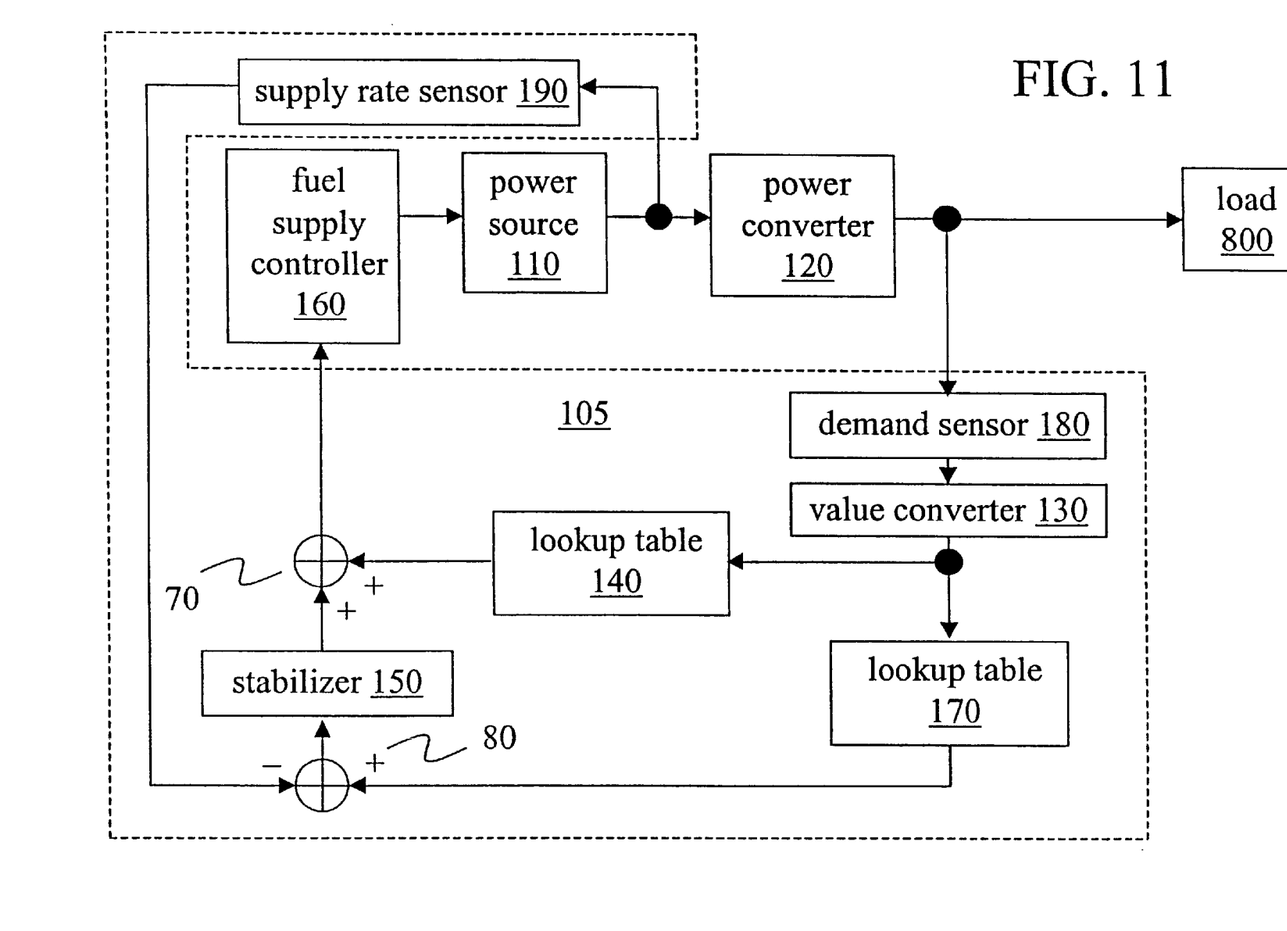
FIG. 11 shows a block diagram for an apparatus according to an embodiment of the invention.
Figure 12:
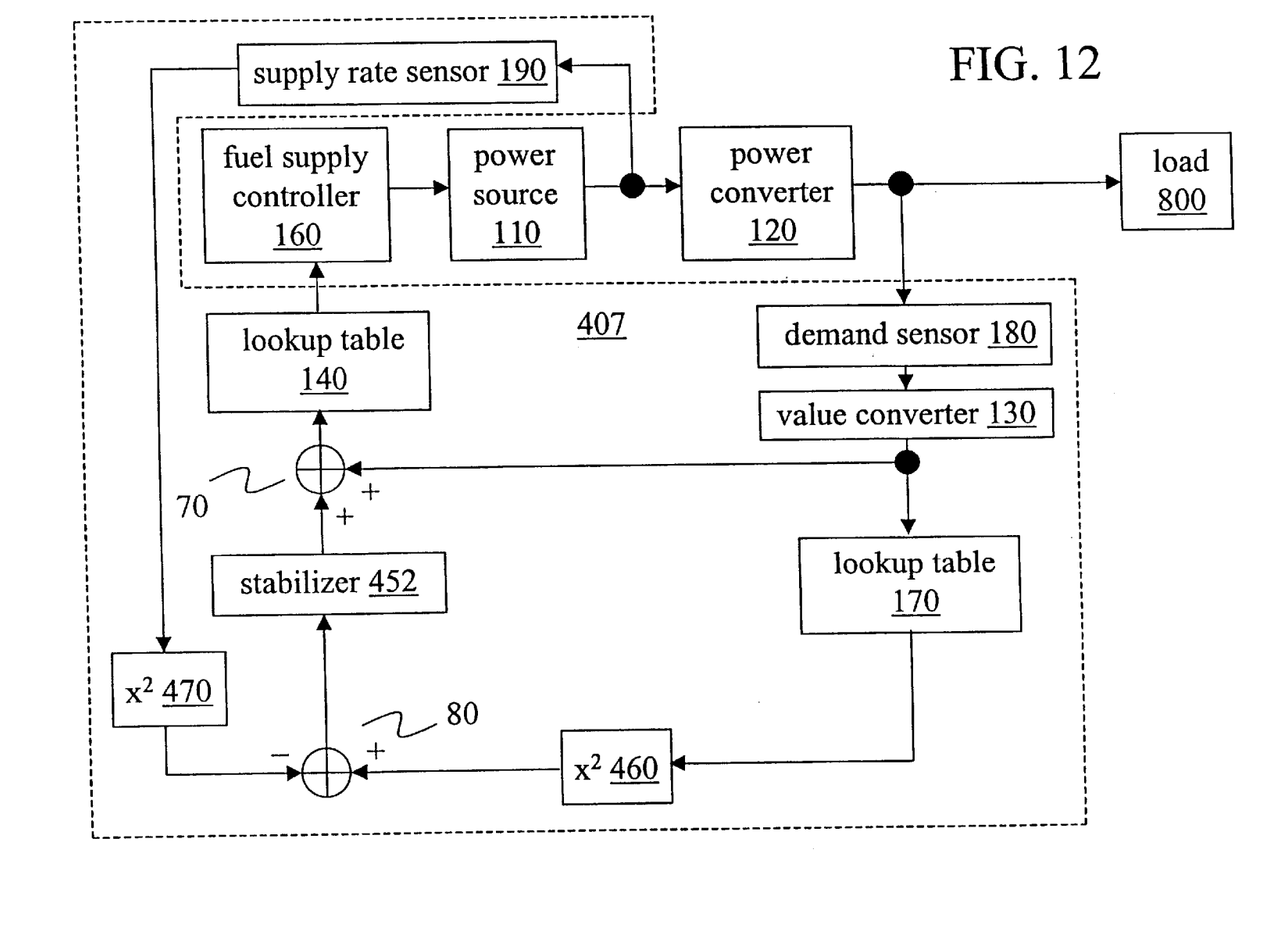
FIG. 12 shows a block diagram for an apparatus according to an embodiment of the invention.

FIG. 11 shows an apparatus 105 according to an embodiment of the invention. This apparatus may be constructed and supplied separately from power source 110 and power converter 120 for use with possibly different power generation systems. Similarly, the apparatus shown in FIG. 12 may be used to perform a function similar to that of the system shown in FIG. 8.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole (as appropriate to the particular embodiment) as a hard-wired circuit or as a circuit configuration fabricated into an application-specific integrated circuit or field programmable gate array. Likewise, the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit. Further, the invention may be implemented in part or in whole as a software program loaded as machine-readable code from or into a data storage medium such as a magnetic, optical, magnetooptical, or phase-change disk or disk drive; a semiconductor memory; or a printed bar code. Thus, the present invention is not intended to be limited to the embodiments shown above but rather is to be accorded the widest scope consistent with the principles and novel features disclosed in any fashion herein.

What is claimed is:

1. A system comprising:

a power source configured and arranged to supply power;

a load configured and arranged to consume power;

a power converter configured and arranged to receive power from said power source and to supply power to said load;

an inertia compensation value producer configured and arranged to receive a power supply requirement value and to produce an inertia compensation value; and a power demand value modifier configured and arranged to receive a power demand value and said inertia compensation value and to produce a modified power demand value, wherein said power supply requirement value is expressible in watts, and wherein said power supply requirement value is based at least in part on a quantity of power consumed by said load, and wherein said power demand value is based at least in part on said power supply requirement value, and wherein said inertia compensation value is based at least in part on said power supply requirement value, and wherein an operation of said power source is based at least in part on said modified power demand value, and wherein said power demand value modifier produces said modified power demand value at least in part by adding a value based at least in part on said inertia compensation value to a value based at least in part on said power demand value.

2. The system according to claim 1, wherein said load consumes electrical power.

3. The system according to claim 2, wherein said load comprises at least one motor.

4. The system according to claim 2, wherein said power converter comprises at least one generator.

5. The system according to claim 2, wherein said power converter further comprises at least one gearbox configured and arranged to couple said power source to said at least one generator.

6. The system according to claim 1, said system further comprising a demand sensor configured and arranged to produce an observed power consumption value, wherein said observed power consumption value is based at least in part on a quantity of power consumed by said load, and wherein said power supply requirement value is based at least in part on said observed power consumption value.

7. The system according to claim 6, said system further comprising a value converter configured and arranged to receive said observed power consumption value, wherein said value converter is further configured and arranged to apply an efficiency reciprocal function to said observed power consumption value to produce said power supply requirement value, and wherein said efficiency reciprocal function relates at least in part to an efficiency of power conversion by said power converter.

8. The system according to claim 1, said system further comprising a fuel supply controller configured and arranged to control a supply of fuel to said power source, wherein said fuel supply controller is further configured and arranged to control said supply of fuel according to at least said modified power demand value.

9. The system according to claim 1, wherein said inertia compensation value producer is further configured and arranged to receive an observed rate value, wherein said observed rate value is based at least in part on a rate of an output of said power source, and wherein said inertia compensation value is based at least in part on said observed rate value.

10. The system according to claim 9, wherein said rate of an output of said power source is expressible as a velocity.

11. The system according to claim 10, wherein said power source is a turbine having an output shaft, and wherein said rate of an output of said power source comprises a rotational speed of said output shaft, and wherein said power converter receives power from said power source at least in part through said output shaft.

12. The system according to claim 11, wherein said turbine has a compressor, and wherein a rotational speed of said compressor is based at least in part on said modified power demand value.

13. The system according to claim 12, wherein said inertia compensation value producer comprises a lookup table configured and arranged to map said power supply requirement value to a rate target value, and wherein said inertia compensation value is based at least in part on said rate target value, and wherein said turbine receives air to support combustion, and wherein said mapping varies at least in part according to a temperature of said air.

14. The system according to claim 12, wherein said inertia compensation value producer comprises a lookup table configured and arranged to map said power supply requirement value to a rate target value, and wherein said turbine receives air to support combustion, and wherein said mapping varies at least in part according to a density of said air.

15. The system according to claim 1, wherein said load is configured and arranged to propel a vehicle.

16. The system according to claim 1, wherein said load is configured and arranged to propel a locomotive.

17. A system comprising:

a power source configured and arranged to produce a first power output;

an energy converter configured and arranged to receive the first power output and to produce a converted power output to drive a load;

a demand sensor configured and arranged to output an observed power consumption value, said observed power consumption value being related to a level of power demanded by the load;

a value converter configured and arranged to receive the observed power consumption value and to output a power supply requirement value;

a first lookup table configured and arranged to receive the power supply requirement value and to produce a rate target value;

a rate sensor configured and arranged to output an observed rate value, said observed rate value being related to a rate of said first power output;

a first adder configured and arranged to subtract said observed rate value from said rate target value to produce a rate error value;

a stabilizer configured and arranged to receive the rate error value and to output an inertia compensation value;

a second lookup table configured and arranged to receive the power supply requirement value and to produce a power demand value;

a second adder configured and arranged to receive the inertia compensation value and the power demand value and to produce a modified power demand value; and a fuel supply controller configured and arranged to receive the modified power demand value and to control the supply of fuel to said power source according to said modified power demand value.

* * * * *